United States Patent Office 3,014,889
Patented Dec. 26, 1961

3,014,889
COMPOSITION COMPRISING RUBBER AND AN N-MONOALKYL POLYALKYL AROMATIC DIAMINE ANTIOZONANT
Richard J. Reynolds, Walnut Creek, and Douglas G. Norton, Berkeley, Calif., assignors to Shell Oil Company, a corporation of Delaware
No Drawing. Filed June 23, 1958, Ser. No. 743,999
16 Claims. (Cl. 260—45.9)

This invention relates to novel rubber additives, and to rubber compositions containing them. More specifically, the invention relates to new and useful N-monoalkyl-substituted tetraalkyl aromatic diamines and to rubber compositions comprising such compounds.

Atmospheric oxygen, which is normally present in air, and atmospheric ozone, which is photochemically produced in air, primarily by the ultraviolet component of daylight, are both harmful to rubber, but their effects differ from one another.

Upon outdoor exposure, light-catalyzed oxidation of rubber surfaces occurs which results in the formation of a skin and gives the exposed surface of the rubber a crazed appearance. Ozone, even in the low concentrations found at the bottom of the atmosphere, attacks only stressed rubber, forming cracks and checks perpendicular to the direction of stress. In such articles as tires, these ozone cracks are the focal points of failure caused by flex fatigue, which extends the cracks deeper into the rubber mass.

In order to protect rubber products from attack by oxygen and ozone, small quantities of stabilizing agents called antioxidants and antiozonants are generally incorporated in the rubber when the product is manufactured. Unfortunately, however, it has been found that antioxidant compounds generally lack antiozonant properties.

A wide variety of types of antiozonant compounds have been incorporated in both natural and synthetic rubber products, and the advantages and disadvantages of these compounds have been widely discussed in the rubber literature. In general, the properties that are desirable for an antiozonant are:

(1) Specific antiozone activity
(2) Non-toxicity under processing and use conditions
(3) Low vapor pressure so as to remain in the rubber during conditions of processing and use
(4) Resistance to heat aging under conditions of use
(5) Limited solubility in the rubber, so as to provide continual migration to the ozone-attacked surface of the rubber
(6) Low cost, coupled with high availability
(7) Non-staining behavior, that is, the compound must not migrate from the rubber product into adjacent substances, such as lacquered or enameled surfaces, in contact with the product
(8) Non-discoloring behavior, that is, the antiozonant must not discolor light-colored rubber products containing it While many of the antiozonants in use at this time possess many of these properties, few possess them all.

Aromatic amines are one of the best-known and most frequently used types of antiozonants for rubber. Typical representatives of such amines, including the N,N'-dialkyl para-phenylenediamines, are extensively discussed in the literature; see, for example, Shaw, Ossefort and Touhey, "Antiozonants for GR–S Rubber," Rubber World 130, 636–640, August 1954. Despite the considerable use of such antiozonants in rubber, the amines are all regarded as being as being of the staining and discoloring type. As a consequence, their utility in such articles as gaskets for refrigerators and automobile windshields, tires, or other light-colored rubber products, or in white sidewall stocks, whose light color must remain unblemished, is limited.

It is an object of our invention to provide a new class of amine antiozonants. A further object of our invention is the provision of a new class of amine antiozonants characterized by outstanding antioxidant properties. Still a further object of our invention is a new class of aromatic amine antiozonants that is non-staining and another object is such a class of antiozonants that is non-discoloring. N-monoalkyldurenediamine antiozonants having these properties are yet another object of the invention as are rubber compositions having improved stability toward ozone and oxygen.

These and other objects are accomplished in our invention by compositions comprising rubber and a compound consisting of a benzene ring substituted on two carbon atoms para to one another with monovalent amino radicals, one of which is a monoalkylamino radical, and on the remaining carbon atoms with hydrocarbyl radicals. The structure of compounds of this type may be shown by the diagram

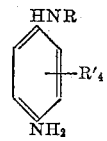

wherein R is an alkyl radical having from 4 to 18 carbon atoms and R' is a hydrocarbyl radical. By hydrocarbyl radical we mean a monovalent hydrocarbon radical, and such radicals may be aliphatic, such as alkyl and alkylene radicals, or they may be cyclic, such as cycloalkyl, phenyl, tolyl, benzyl and xylyl radicals. We prefer, however, to employ such N-monoalkyl tetrahydrocarbyl mononuclear aromatic diamines wherein the ring substituents are alkyl radicals, and most preferably those having up to eight carbon atoms. Whatever their nature, however, the ring substituents designated by R' in the diagram may be the same radical, or they may be different.

The N-monoalkyl tetrahydrocarbyl monoaromatic diamines which serve as rubber antiozonants in our invention may be prepared in a variety of ways. For example, they may be prepared as one component of a mixture of diamines via the method described in British patent specification 712,100, issued to Ward, Lamb and Hodgson on July 21, 1954. A few examples of such diamines, having structural characteristics which render them particularly suitable for use as rubber antiozonants in our invention are:

N-butyl tetraethyl p-phenylenediamine
N-isobutyl-2-ethyl-3,5,6-trimethyl-p-phenylenediamine
N-octyl-2,5-diphenyl-3,6-dipropyl-p-phenylenediamine
N-dodecyl-tetrapropyl-p-phenylenediamine
N-(2-butyl)tetrapropyl-p-phenylenediamine The particularly preferred class of N-monoalkyl tetrahydrocarbyl-substituted monoaromatic diamines that both may be easily synthesized from materials in commercial supply and display outstanding antioxidant properties are the N-monoalkyldurenediamines, which may be readily prepared from dinitrodurene. Exemplary N-monoalkyldurenediamines include:

N-isobutyldurenediamine
N-(3-pentyl)durenediamine
N-(2,4-dimethyl-3-amyl)durenediamine
N-hexyldurenediamine
N-octyldurenediamine
N-decyldurenediamine These compounds are active antiozonants and are surprisingly effective in comparatively small quantities in rubber compositions. Thus, amounts as small as about 0.1% by weight are found to give rubber useful protection against ozone cracking. On the other hand, including amounts of the N-monoalkyl tetrahydrocarbyl mononuclear aromatic diamines above about 5% by weight does not appear to materially enhance the aging properties of the rubber, and we therefore regard quantities of the additive on the order of about 5% by weight as the most useful and economical upper limit.

The additives of the present invention may be employed in rubber in conjunction with the other materials commonly included in the course of manufacture of rubber articles. Such other materials include fillers, pigments, accelerators, wax, lubricants, and the like.

These N-monoalkyl tetrahydrocarbyl monoaromatic diamines, by virtue of their extensive substitution, are far less volatile than the unsubstituted p-phenylenediamines of the art. As a consequence, rubber compositions containing these compounds are free from the undesirable odors imparted by the more volatile antiozonants. Moreover, this significant reduction in volatility reduces any toxicity hazard encountered in compounding the additives in rubber stocks.

In addition, the N-monoalkyl aromatic diamines of our invention have a desirable accelerating effect on the curing properties of some rubber stocks. Thus, some savings may be made by decreases in accelerator levels used with standard factory stocks. Otherwise, the N-monoalkyl aromatic diamines of our invention do not alter handling characteristics of these stocks or their ultimate vulcanizate properties.

The compounds described are compatible with most rubbers, both natural and synthetic, and the compositions of this invention include mixtures of the N-monoalkyl aromatic diamines with natural rubber, that is, latex derived from *Hevea brasiliensis,* as well as synthetic polyisoprene rubbers and rubbers based on butadiene or copolymers of butadiene and styrene, Buna-N rubbers based on copolymers of butadiene and acrylontrile, neoprene rubbers prepared by polymerization of chloroprene, and butyl rubber prepared by polymerization of isobutylene with isoprene. In general, all rubbers containing residual unsaturated linkages are susceptible to attack by atmospheric ozone, and therefore the compositions of our invention are valuable in that they resist such attack and prevent surface deterioration.

The mode in which our stabilized rubber compositions are prepared is not of critical importance, and the usual compounding methods of the rubber art may be employed. Thus, the N-monoalkyl tetrahydrocarbyl mononuclear aromatic diamines may be added to rubber latex in the form of a finely divided solid or aqueous dispersion before coagulation, or it may be milled into the coagulated crude rubber. Other compounding methods apparent to those skilled in the art are also equally suitable.

The several modifications of our invention, as well as the objects and advantages thereof, are illustrated in the following examples. It is to be understood, however, that the examples are for the purposes of illustration only, and the invention is not to be regarded as limited to the specific materials or conditions recited therein. Unless otherwise noted, all proportions given in the examples are in parts by weight.

EXAMPLE I

*Ozone-resistant rubber compositions*

The antiozonant properties of the compounds of this invention were evaluated in the following manner. Both synthetic rubber tread and natural rubber sidewall strips were prepared, employing the following recipes.

| Recipe, Parts by Weight | Synthetic Rubber Tread | Natural Rubber White Sidewall |
|---|---|---|
| Synthetic Rubber (SBR-1502) | 100.0 | |
| Pale Crepe Rubber-1X | | 100.0 |
| Stearic Acid | 2.0 | 2.0 |
| Zinc Oxide | 3.0 | 70.0 |
| Rutile, TiO$_2$ | | 20.0 |
| HAF Carbon Black | 50.0 | |
| N-cyclohexyl-2-benzothiazole sulfenamide | 1.0 | |
| Benzothiazyl Disulfide | | 1.5 |
| Sulfur | 1.75 | 2.50 |
| Heliozone Wax | 3.0 | 3.0 |
| Antiozonant | 2.0 | 2.0 |

Equivalent samples were also prepared containing no antiozonant. All samples were cured at 292° F. to yield maximum tensile strengths (about 3500 p.s.i.). The strips so prepared were exposed to an atmosphere containing 50±5 parts of ozone per hundred million of air, at a temperature of 100° F. and at an elongation of 30% for 96 hours. At the end of the exposure, the properties and appearance of the strips were evaluated, and the results appear in the following tables. All stress-strain tests in these examples were conducted according to ASTM D412.

ANTIOZONANT PROPERTIES—SIDEWALL RECIPE

| Antiozonant | Cure, Min. | Initial Vulcanizate Properties | | | Percent Retention of Properties After 48 Hrs. Ozone Exposure | | Visual Rating,* 96 Hours Ozone Exposure |
|---|---|---|---|---|---|---|---|
| | | Tensile Strength, p.s.i. | 500% Modulus, p.s.i. | Ultimate Elongation, percent | Tensile Strength | Ultimate Elongation | |
| None | 35 | 3,345 | 1,470 | 690 | 34 | 68 | 5 |
| 6-Ethoxy-1,2-dihydro-2,2,4-trimethyl quinoline | 15 | 3,460 | 1,690 | 685 | 65 | 77 | 2 |
| N,N'-di-3(5-methylheptyl)p-phenylenediamine | 25 | 3,320 | 1,490 | 680 | 71 | 83 | 4 |
| N-sec-butyl durene diamine | 15 | 3,790 | 1,910 | 675 | 64 | 81 | 1 |
| N-3(5-methylheptyl)durenediamine | 15 | 3,690 | 1,810 | 670 | 54 | 72 | 3 |

*1=Best. 5=Worst.

ANTIOZONANT PROPERTIES—THREAD RECIPE

| Antiozonant | Cure, Min. | Initial Vulcanizate Properties | | | Percent Retention of Properties After 48 Hrs. Ozone Exposure | | Visual Rating,* 96 Hours Ozone Exposure |
|---|---|---|---|---|---|---|---|
| | | Tensile Strength, p.s.i. | 300% Modulus, p.s.i. | Ultimate Elongation, percent | Tensile Strength | Ultimate Elongation | |
| None | 35 | 3,460 | 2,300 | 405 | 27 | 39 | 5 |
| 6-Ethoxy-1,2-dihydro-2,2,4-trimethyl quinoline | 45 | 3,520 | 2,220 | 430 | 69 | 67 | 1 |
| N,N'-di-3(5-methylheptyl)p-phenylenediamine | 75 | 3,555 | 2,220 | 435 | 69 | 66 | 4 |
| N-sec-butyldurenediamine | 75 | 3,600 | 2,250 | 430 | 79 | 74 | 2 |
| N-3 5-methylheptyl) durenediamine | 35 | 3,450 | 2,290 | 405 | 70 | 69 | 3 |

*1=Best. 5=Worst.

It will be apparent from the tables that after ozone exposure the rubber samples containing the N-alkyldurenediamines had visual quality and physical properties essentially equal to or better than those of the other antiozonants examined.

EXAMPLE II

The antioxidant properties of the antiozonants of the invention were tested by exposing samples of the white sidewall rubber strips, prepared as in Example I, in an oxygen bomb containing gaseous oxygen at a pressure of 300 p.s.i.g. for 7 days at 158° F. The results of those tests are presented in the following table:

ANTIOXIDANT QUALITY—WHITE SIDEWALL RECIPE

| Antiozonant | Cure, Min. | Unaged Vulcanizate Properties | | | Vulcanizate Properties After Oxygen Aging | | |
|---|---|---|---|---|---|---|---|
| | | Tensile Strength, p.s.i. | 500% Modulus, p.s.i. | Ultimate Elongation, p.s.i. | Tensile Strength, p.s.i. | 500% Modulus, p.s.i. | Ultimate Elongation, Percent |
| None | 35 | 3,345 | 1,470 | 690 | 230 |  | 145 |
| 6-Ethoxy-1,2-dihydro-2,2,4-trimethyl quinoline | 15 | 3,640 | 1,690 | 685 | 3,200 | 2,120 | 610 |
| N,N'-di-3(5-methylheptyl) p-phenylenediamine | 25 | 3,320 | 1,490 | 680 | 2,410 | 1,540 | 615 |
| N-sec-butyldureneamine | 15 | 3,790 | 1,910 | 675 | 3,250 | 2,100 | 625 |
| N-3(5-methylheptyl) durenediamine | 15 | 3,690 | 1,810 | 670 | 3,280 | 2,120 | 615 |

It will be seen from the table that the rubber samples containing N-alkyldurenediamine retained properties superior to those of the sample containing N,N'-dialkyl p-phenylenediamine.

EXAMPLE III

The resistance to staining and discoloration of samples of the white sidewall and tread rubber compositions prepared in Example I was determined.

In the staining resistance test, tread stock samples were dip-coated with one coat of white lacquer and then allowed to dry. They were then exposed for 24 hours to visible and ultraviolet light in a sun lamp cabinet. Before and after exposure the reflectance of the lacquer coat was measured with a Lumatron Model 402-E Colorimeter, using a Tri-Blue Filter. The standard upon which the measurements were based was a magnesium oxide-coated control panel arbitrarily rated at 100% reflectance.

In the discoloration resistance test, white sidewall stocks were exposed for 24 hours in the sun lamp cabinet in the same manner as the tread stocks in the staining resistance tests, and the reflectance of the samples before and after the tests measured as in the staining resistance tests.

The staining and discoloration of the several antiozonants, measured in terms of loss of reflectance of the surfaces, are presented in the following table.

| Antiozonant | Discoloration Resistance | | Staining Resistance | |
|---|---|---|---|---|
| | Reflectance Before Exposure | Reflectance After Exposure | Reflectance Before Exposure | Reflectance After Exposure |
| None | 74 | 59 | 81 | 77 |
| 6-Ethoxy-1,2-dihydro-2,2,4-trimethyl quinoline | 57 | 17 | 58 | 28 |
| N,N'-3(5-methylheptyl) p-phenylene diamine | 68 | 9 | 48 | 39 |
| N-sec-butyldurene-diamine | 67 | 30 | 63 | 49 |
| N-3(5-methylheptyl) durenediamine | 70 | 38 | 62 | 61 |

It is evident from these data that the samples containing N-alkyldurenediamine antiozonant resisted discoloration and staining far better than those containing other antiozonants.

We claim as our invention:

1. A composition of matter comprising rubber containing residual olefinically-unsaturated linkages susceptible to attack by atmospheric ozone containing a compound having the structure

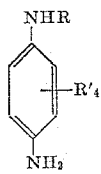

where R is an alkyl radical having from 4 to 18 carbon atoms, and R' is an alkyl radical having from 1 to 8 carbon atoms.

2. A composition of matter comprising rubber containing residual olefinically-unsaturated linkages susceptible to attack by atmospheric ozone, containing an N-monoalkyldurenediamine, wherein the monoalkyl substituent has from 4 to 18 carbon atoms.

3. The composition of claim 2, wherein the N-monoalkyl substituent has four carbon atoms.

4. The composition of claim 2, wherein the N-monoalkyldurenediamine is N-sec-butyldurenediamine.

5. The composition of claim 2, where the N-monoalkyl substituent has six carbon atoms.

6. The composition of claim 2, where the N-monoalkyl substituent has eight carbon atoms.

7. The composition of claim 2, where the N-monoalkyldurenediamine is N-3(5-methylheptyl)durenediamine.

8. The composition of claim 2, where the N-monoalkyl substituent has eighteen carbon atoms.

9. The process of protecting rubber containing residual olefinically-unsaturated linkages susceptible to attack by atmospheric ozone, from attack by ozone, which comprises mixing with the rubber a compound having the structure

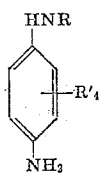

where R is an alkyl radical having from 4 to 18 carbon atoms and R' is an alkyl radical having from 1 to 8 carbon atoms.

10. The process of protecting rubber containing residual olefinically-unsaturated linkages susceptible to attack from atmospheric ozone, from attack by ozone, which comprises mixing with the rubber an N-monoalkyldurenediamine, wherein the monoalkyl substituent has from 4 to 18 carbon atoms.

11. The process of claim 10 wherein the N-monoalkyl substituent has four carbon atoms.

12. The process of claim 10 where the N-monoalkyldurenediamine is N-sec-butyldurenediamine.

13. The process of claim 10, wherein the N-monoalkyl substituent has six carbon atoms.

14. The process of claim 10, wherein the N-monoalkyl substituent has eight carbon atoms.

15. The process of claim 10, wherein the N-monoalkyldurenediamine is N-3(5-methylheptyl)durenediamine.

16. The process of claim 10, wherein the N-monoalkyl substituent has eighteen carbon atoms.

References Cited in the file of this patent

UNITED STATES PATENTS

| | | |
|---|---|---|
| 2,067,686 | Semon | Jan. 12, 1937 |
| 2,121,618 | Williams et al. | June 21, 1938 |
| 2,851,438 | Tucker | Sept. 9, 1958 |
| 2,867,604 | Rosenwald | Jan. 6, 1959 |